United States Patent
McGee

(10) Patent No.: US 9,215,161 B2
(45) Date of Patent: Dec. 15, 2015

(54) AUTOMATED SELECTION OF AN OPTIMAL PATH BETWEEN A CORE SWITCH AND TEAMED NETWORK RESOURCES OF A COMPUTER SYSTEM

(75) Inventor: Michael Sean McGee, Round Rock, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 2192 days.

(21) Appl. No.: 11/048,520

(22) Filed: Feb. 1, 2005

(65) Prior Publication Data

US 2005/0270980 A1    Dec. 8, 2005

Related U.S. Application Data

(60) Provisional application No. 60/577,761, filed on Jun. 7, 2004.

(51) Int. Cl.
| | |
|---|---|
| *H04L 12/26* | (2006.01) |
| *H04L 12/701* | (2013.01) |
| *H04L 12/721* | (2013.01) |
| *H04L 12/707* | (2013.01) |
| *H04L 12/703* | (2013.01) |

(52) U.S. Cl.
CPC .............. *H04L 45/00* (2013.01); *H04L 45/12* (2013.01); *H04L 45/22* (2013.01); *H04L 45/28* (2013.01); *H04L 45/66* (2013.01)

(58) Field of Classification Search
CPC ..................................................... H04L 45/66
USPC ........... 370/235, 390, 217; 709/223, 238, 220
See application file for complete search history.

(56) References Cited

U.S. PATENT DOCUMENTS

| | | | | |
|---|---|---|---|---|
| 6,229,538 | B1* | 5/2001 | McIntyre et al. | 715/734 |
| 6,381,218 | B1* | 4/2002 | McIntyre et al. | 370/245 |
| 6,535,491 | B2* | 3/2003 | Dutt et al. | 370/256 |
| 6,578,086 | B1* | 6/2003 | Regan et al. | 709/242 |
| 6,636,499 | B1* | 10/2003 | Dowling | 370/338 |
| 6,898,183 | B1* | 5/2005 | Garakani | 370/238 |
| 6,938,092 | B2* | 8/2005 | Burns | 709/230 |
| 2003/0140124 | A1* | 7/2003 | Burns | 709/220 |
| 2003/0167346 | A1* | 9/2003 | Craft et al. | 709/250 |
| 2004/0098501 | A1* | 5/2004 | Finn | 709/236 |
| 2005/0039179 | A1* | 2/2005 | Eddie et al. | 717/171 |
| 2005/0063395 | A1* | 3/2005 | Smith et al. | 370/399 |

(Continued)

OTHER PUBLICATIONS

Broadcom NetXtreme Gigabit Ethernet Adapter User's Guide.*
Cisco Software Configuration Guide.*
EtherChannel Between Catalyst running CatOS.*
Cisco EtherChannel Technology.*

*Primary Examiner* — John Blanton
(74) *Attorney, Agent, or Firm* — Hewlett Packard Enterprise Development LP.

(57) ABSTRACT

A NIC teaming intermediate driver running on a computer system binds NIC resources into teams to provide a physical interface for the computer system to the network. When configuring a team, the teaming driver assigns one of the team members to be the primary resource and the others to be secondary. When one or more members of the team are coupled to more than one path through a layer 2 network to a core switch, the intermediate driver listens to frames transmitted over the layer 2 network regarding the cost (i.e. the bandwidth) of various connections between switches in the network and chooses the primary member to be that member coupled to the lowest cost path (i.e. highest bandwidth).

16 Claims, 9 Drawing Sheets

(56) References Cited

U.S. PATENT DOCUMENTS

| | | | |
|---|---|---|---|
| 2005/0066216 A1* | 3/2005 | Hebbar et al. | 714/1 |
| 2005/0073998 A1* | 4/2005 | Zhu et al. | 370/352 |
| 2005/0080923 A1* | 4/2005 | Elzur | 709/238 |
| 2005/0198371 A1* | 9/2005 | Smith et al. | 709/238 |
| 2005/0259649 A1* | 11/2005 | Smith | 370/389 |

* cited by examiner

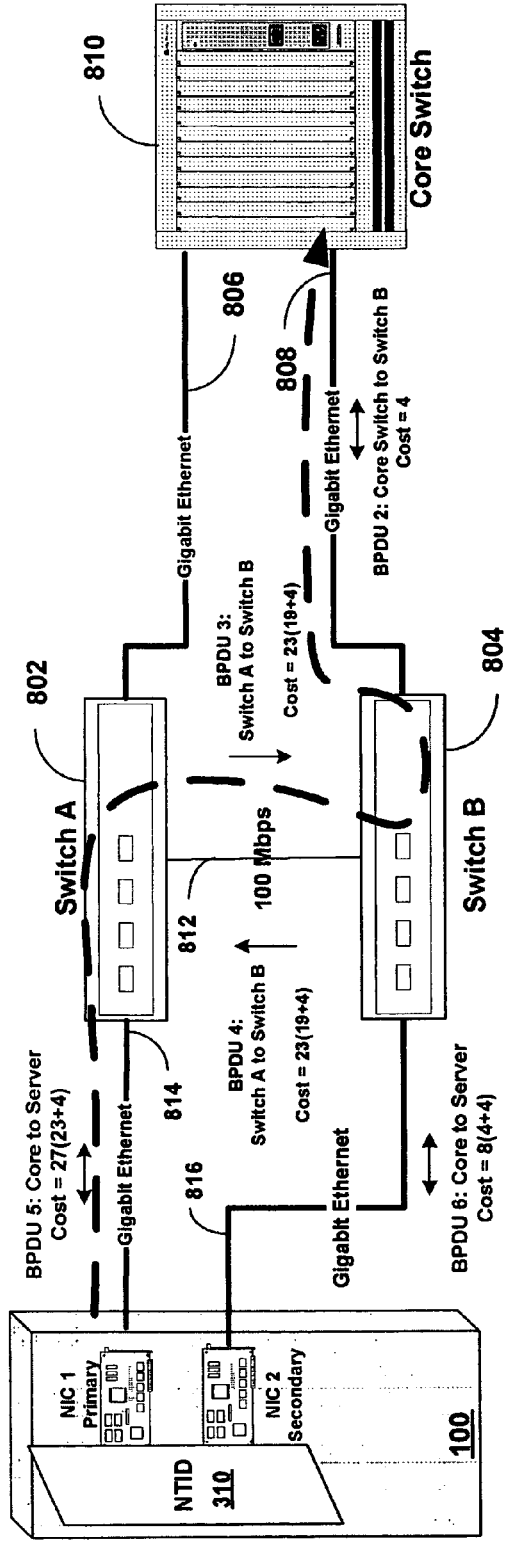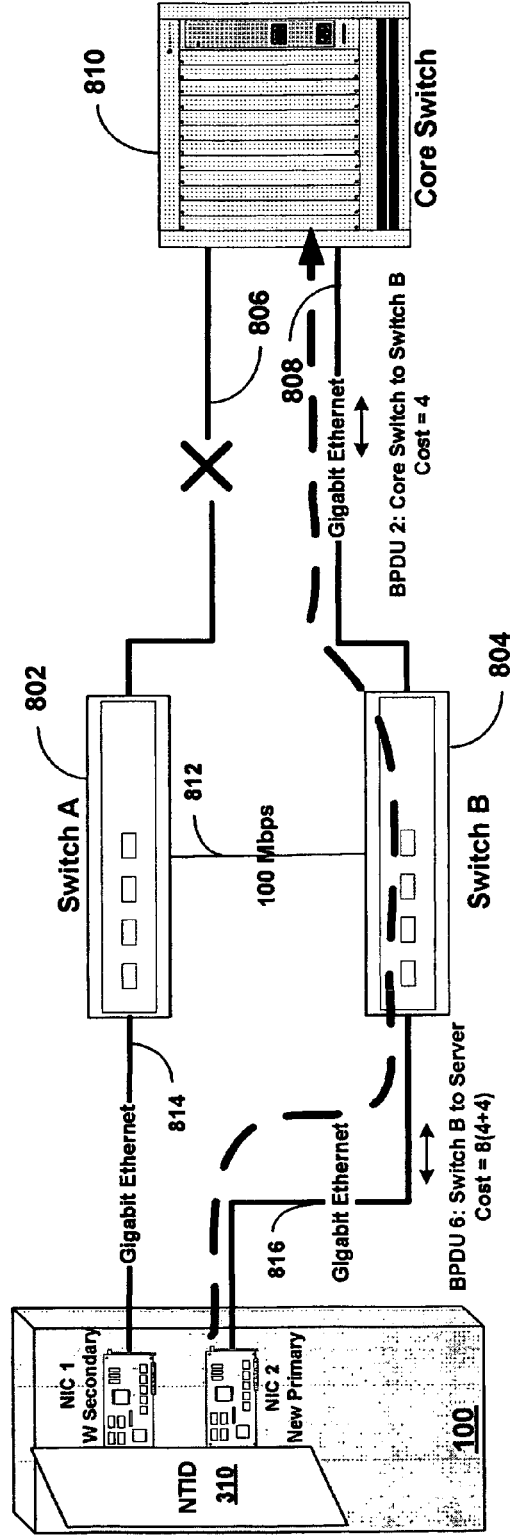

AUTOMATED SELECTION OF AN OPTIMAL PATH BETWEEN A CORE SWITCH AND TEAMED NETWORK RESOURCES OF A COMPUTER SYSTEM

This application claims the benefit of U.S. Provisional Application No. 60/577,761, filed Jun. 7, 2004

BACKGROUND

Computers and other devices are commonly interconnected to facilitate communication among one another using any one of a number of available standard network architectures and any one of several corresponding and compatible network protocols. The nature of standard architectures and their topologies is typically dictated at the first two layers of the OSI (Open Systems Interconnection) Basic Reference Model for networks, which are the physical layer (layer 1) and the datalink layer (layer 2). One of the most commonly employed of such standard architectures is the Ethernet® network architecture. Other types of network architectures that are less widely used include ARCnet, Token Ring and FDDI. Variations of the Ethernet® standard are differentiated from one another based on characteristics such as maximum throughput (i.e. the highest data transmission rate) of devices coupled to the network, the type of medium used for physically interconnecting the devices (e.g. coaxial cable, twisted pair cable, optical fibers, etc.) and the maximum permissible length of the medium.

The 10Base-T and 100Base-T Ethernet® standards, for example, designate a maximum throughput of 10 and 100 Megabits per second respectively, and are coupled to the network over twisted pair cable. The 1000Base-T (or Gigabit) Ethernet® standard designates a maximum throughput of 1000 Mbps (i.e. a Gigabit per second) over twisted pair cable. Recent advancement in the speed of integrated circuits has facilitated the development of even faster variations of the Ethernet® network architecture, such as one operating at 10 Gigabits per second (10 Gbps) and for which the transmission medium is typically optical fibers. Of course, the greater the throughput, the more expensive the network resources required to sustain that throughput. Ethernet® is a registered trademark of Xerox Corporation.

Packet switched network protocols are commonly employed with a number of architectures such as the Ethernet® standard. These protocols are typically defined by layers 3 and 4 of the OSI and dictate the manner in which data to be transmitted between devices coupled to the network are formatted into packets for transmission. These protocols are independent of the architecture and topology by virtue of their separation as hierarchical layers of the OSI. Examples of such protocols include Transmission Control Protocol/Internet Protocol (TCP/IP), the Internet Protocol eXchange (IPX), NetBEUI and the like. NetBEUI is short for NetBIOS Enhanced User Interface, and is an enhanced version of the NetBIOS protocol used by network operating systems such as LAN Manager, LAN Server, Windows® for Workgroups, Windows®95 and Windows NT®, Windows® and Windows NT® are registered trademarks of Microsoft Corporation. NetBEUI was originally designed by IBM for IBM's LAN Manager Server and later extended by Microsoft and Novell. TCP/IP is typically used in Internet applications, or in intranet applications such as a local area network (LAN). The data packets received through a network resource of the destination device are processed in reverse according to the selected protocol to reassemble the payload data contained within the received packets. In this manner, computers and other devices can share information in accordance with these higher level protocols over the common network.

One of the most basic and widely implemented network types is the Local Area Network (LAN). In its simplest form, a LAN is a number of devices (e.g. computers, printers and other specialized peripherals) connected to one another by some form of signal transmission medium such as coaxial cable to facilitate direct peer-to-peer communication there between. A very common network paradigm, often employed in LANs as well as other networks, is known as the client/server paradigm. This paradigm involves coupling one or more large computers (typically having very advanced processing and storage capabilities) known as servers to a number of smaller computers (such as desktops or workstations) and other peripheral devices shared by the computers known as clients. The clients send requests over the network to the one or more servers to facilitate centralized information storage and retrieval through programs such as database management and application programs stored on the server(s). Servers may also be used to provide centralized access to other networks and various other services as are known to those of skill in the art. The servers provide responses over the network to the clients in response to their requests. Clients and/or servers can also share access to peripheral resources, such as printers, scanners, and the like over the network.

LANs are sometimes coupled together to form even larger networks, such as wide area networks (WANs), or they may be coupled to the Internet. LANs may also be segmented into logical sub-networks called segments. This can be accomplished through the use of multiple switches that do not communicate with one another (i.e. they are noncontiguous) or through the creation of virtual LANs (VLANs). The isolation between VLANs and a particular network device's access to the segments are controlled by a switch that can be programmed in real time to couple network resources of that device to one, some or all of the VLAN segments.

For a given network architecture such as Ethernet®, various network topologies may be implemented. A network topology simply defines the manner in which the various network devices are physically interconnected. For example, the simplest topology for an Ethernet® LAN is a bus network. A bus network couples all of the devices to the same transmission medium (e.g. cable, optical fiber, etc.). One manner in which this is commonly accomplished is through use of a T-connector and two cables to connect one device to T-connectors coupled to each of its two neighbors on the network. The problem with the bus network approach is that if the interface for one of the devices fails or if one of the devices is removed from the network, the network bus must be reconnected to bypass the missing or malfunctioning device or the network is broken.

A better approach is to use a star topology, where all of the network devices are coupled together through a device such as a concentrator. A concentrator acts to consolidate all of the network connections to a single point, and is able to combine signals received from slower devices to communicate with a device capable of supporting a higher throughput. Thus, requests coming from several clients may be combined and sent to a server if the server has the ability to handle the higher data rate of the combined signals. Each of the network devices is coupled through one connector to the concentrator, and if any one of the devices is removed from the network, the other devices can continue to communicate with one another over the network without interruption.

Another topology that may be used when higher bandwidth is desired is a hub network. A hub network is similar to the bus network described above in that it involves a single connective medium through which a number of devices are interconnected. The difference is that for a hub network, the devices coupled to the single connector are hub devices rather than single network devices. Each hub device can couple a large number of network devices to the single connector. The single connector, called a backbone or core switch, can be designed to have a very high bandwidth sufficient to handle the confluence of data from all of the hubs.

Network interface resources are required to couple computers and other devices to a network. These interface resources are sometimes referred to as network adapter cards or network interface cards (NICs), each adapter card or NIC having at least one port through which a physical link is provided between the network transmission medium and the processing resources of the network device. Data is communicated (as packets in the case of packet switched networks) from the processing resources of one network device to the other. The data is transmitted and received through these interface resources and over the media used to physically couple the devices together. Adapter cards or NICs are commercially available that are designed to support one or more variations of standard architectures and known topologies.

Each of the network devices typically includes a bus system through which the processing resources of the network devices may be coupled to the NICs. The bus system is usually coupled to the pins of edge connectors defining sockets for expansion slots. The NICs are coupled to the bus system of the network device by plugging the NIC into the edge connector of the expansion slot. In this way, the processing resources of the network devices are in communication with any NICs or network adapter cards that are plugged into the expansion slots of that network device. As previously mentioned, each NIC or network adapter must be designed in accordance with the standards by which the network architecture and topology are defined to provide appropriate signal levels and impedances (i.e. the physical layer) to the network. This of course includes an appropriate physical connector for interfacing the NIC to the physical transmission medium employed for the network (e.g. coaxial cable, twisted-pair cable, fiber optic cable, etc.)

It is desirable that certain connections (e.g. access by clients to network server(s)) be as reliable as possible. It is also desirable that some network devices (e.g. network server(s)) be able to receive and respond to numerous incoming requests from other devices on the network (such as clients) as quickly as possible. As processing speed continues to increase and memory access time continues to decrease for a network device such as a server, the bottleneck for device throughput becomes pronounced at the interface to the network. While network architectures and associated network adapters are being designed to handle ever-increasing throughput rates, the price for implementing interface resources supporting the highest available throughput is not always cost-effective.

In light of the foregoing, it has become common to improve the reliability and throughput of a network by coupling some or all of the network devices to the network through redundant network resources. These redundant links to the network may be provided as a plurality of single-port NICs, one or more NICs each having more than one port or a combination thereof. Teaming of network interface resources is particularly common for servers, as the demand for throughput and reliability is typically greatest for servers on a network. Resource teams are typically two or more NICs (actually two or more NIC ports) logically coupled in parallel to appear as a single virtual network adapter to the other devices on the network. These resource teams can provide aggregated throughput of data transmitted to and from the network device employing the team and/or fault tolerance (i.e. resource redundancy to increase reliability).

Fault tolerant teams of network resources commonly employ two or more network adapter or NIC ports, one port being "active" and designated as the "primary," while each of the other members of the team are designated as "secondary" and are placed in a "standby" mode. A NIC or NIC port in standby mode remains largely idle (it is typically only active to the limited extent necessary to respond to system test inquiries to indicate to the team that it is still operational) until activated to replace the primary adapter when it has failed. In this way, interruption of a network connection to a critical server may be avoided notwithstanding the existence of a failed network adapter card or port.

Load-balancing teams of network resources combine one or more additional network adapters or NICs to increase the aggregate throughput of data traffic between the network and the device. In the case of "transmit" load balancing (TLB) teams, throughput is aggregated for data transmitted from the device to the network. The team member designated as primary, however, handles all of the data received by the team. In the case of "switch-assisted" load balancing (SLB) teams, throughput is balanced over all team members for data transmitted to the network as in TLB teams as well as data received by the team from the network. Typically, the received data is balanced with the support of a switch that is capable of performing load balancing of data destined for the team.

Load-balancing teams employ various algorithms by which network traffic through the team is balanced between the two or more network adapter cards, with transmit load-balancing algorithms usually residing in the transmitting network device, and the receive data load-balancing algorithm residing in the switch to which the team is coupled. Load-balancing teams inherently provide fault tolerance, but most commonly at a lower aggregate throughput than the fully functional team. Employing multiple network resources in tandem can enable a server to meet increasing demands for throughput where one NIC or NIC port would have become saturated (i.e. reached its maximum throughput) without meeting all of the demand. This can happen at a server NIC or NIC port, for example, as more client computers are added to a growing network or as processing capability of existing clients is upgraded, leading to an increase in the rate of client requests and responses to and from the server.

It is sometimes advantageous to assign members of the same NFT or TLB team of a computer system, such as a server, to two or more separate network paths to a core switch. Each path usually has at least one switch that serves a different group of clients or other network devices that is coupled to the core switch through a connection such as a high-speed uplink. Each path and its associated switch(es) form part of a contiguous (i.e. all devices on the segment can communicate with one another) network segment or subnet. In such a configuration, because there is more than one path from the server and its team of network resources to the core switch, it is not unusual for these paths to have significant differences in cumulative bandwidth between the computer system and the core network. Each path of the segment can therefore be ascribed a cost value commensurate with their relative throughput (e.g. the lower the throughput of a given path, the greater the cost of that path).

In the past when teams of resources have been configured, the process of assigning a team member as the primary member has not necessarily contemplated the most cost optimal path. The teaming software typically has a default mode for assigning the role of primary (e.g. assign the member resource of the team occupying the lowest numbered slot to be the primary and all others to be secondary members). More sophisticated users can initially configure the resources statically by arranging the primary to be coupled to the lowest cost path when the system is first set up. This can be accomplished by coupling the lowest cost path to the resource of the team that will be assigned the role of primary by default. In the alternative, the software can be manually overridden (through a user interface to the teaming software) to initially assign the role of primary to that resource that the user knows to be coupled to the lowest cost path. Statically optimized configurations can quickly become non-optimal under changing network conditions. For example, an uplink in one path from a switch to the core switch may fail. A redundant connection may be available to bypass the lost link to the core switch that is activated in response to the failure. However, the redundant connection may increase the cost of that path and render it no longer the most optimal path available. The conditions can also change as network devices and/or transmission media are added or replaced.

SUMMARY OF THE INVENTION

An embodiment of a method of the invention automatically selects an optimal one of a plurality of paths coupling a computer system through a team of network resources to a core switch of a layer 2 network. The team of network resources has one or more members coupled to each one of the plurality of paths. The computer system continuously monitors data on the layer 2 network that defines a cost for each of the plurality of paths and configures the team such that one of the one or more resources coupled to a lowest cost one of the plurality of paths is designated as a primary resource of the team.

BRIEF DESCRIPTION OF THE DRAWINGS

For a detailed description of embodiments of the invention, reference will now be made to the accompanying drawings in which:

FIG. 7A is the network diagram of FIG. 6B illustrating a path through the network that bypasses the failure;

FIG. 7B is the network diagram of FIG. 6B illustrating a more optimal path through the network resulting from an embodiment of the invention;

NOTATION AND NOMENCLATURE

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NICs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may illustrate implementations employing the Ethernet architecture and one possible topology, those skilled in the art will appreciate that the invention disclosed herein is not intended to, nor should it be, limited to the Ethernet architecture or the topology illustrated.

Figure 1:
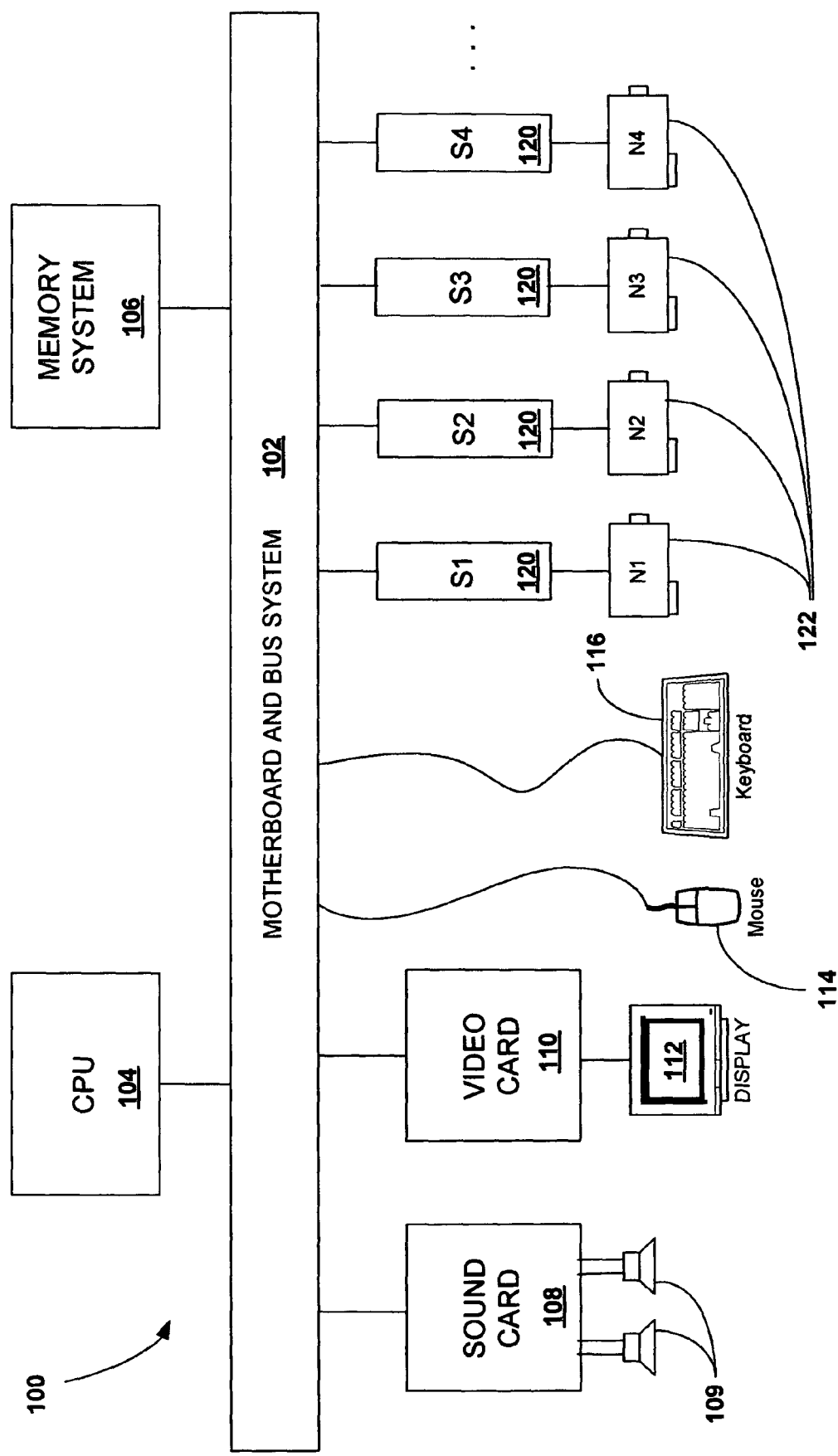
FIG. 1 is a block diagram that illustrates various features of a computer system, including some features by which the computer system is coupled to a network in accordance with an embodiment of the present invention.

FIG. 1 is a block diagram of a computer system 100 that illustrates various features of a computer system 100, including some of those features used to couple it to a network in accordance with an embodiment of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 are shown coupled to the respective slots S1-S4. The bus implemented for slots 120 and the NICs 122 is typically dictated by the design of the adapter card itself.

As described more fully below, each of the NICs 122 enables the computer system to communicate through at least one port with other devices on a network to which the NIC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of load balancing and/or fault tolerance. Additionally, two or more of the NICs (or NIC ports) 122 may be split between distinct paths or segments of a network that ultimately connect to a core switch.

If employed in a packet-switched network, each of the NICs 122 (N1-N4) of FIG. 1 transmits to and receives from the network, packets (e.g. Ethernet® formatted packets or the like) generated by the processing resources of the transmitting network device. The formatting of the packets is defined by the chosen transmission protocol as previously discussed. It will be understood by those skilled in the art that each device on a network uses one or more unique addresses by which it communicates with the other devices on the network. Each address corresponds to one of the layers of the OSI model and is embedded in the packets for both the source device as well as the destination device. Typically, a device will use an address at layer 2 (the data link layer) known as a MAC (media access control) address and an address at layer 3 (the network layer) known as a protocol address (e.g. IP, IPx AppleTalk, etc.). The MAC address can be thought of as being assigned to the physical hardware of the device (i.e. the adapter or NIC port providing the link to the network) whereas the protocol address is assigned to the software of the device. When multiple protocols reside on the same network device, a protocol address is usually assigned to each resident protocol.

For Ethernet® networks, devices communicate directly using their respective MAC (i.e. layer 2) addresses, even though the software for each device initiates communication with one or more other network devices using their protocol addresses. Ethernet® devices must first ascertain the MAC address corresponding to a particular protocol address identifying a destination device. For the IP protocol, this is accomplished by first consulting a cache of MAC address/protocol address pairs maintained by each network device. If an entry for a particular protocol address is not there, a process is initiated whereby the sending device broadcasts a request to all devices on the network for the device having the destination protocol address to send back its MAC address. This is known as ARP (address resolution protocol), the result of which is then stored in the cache. The packets are then formed by embedding the source and destination addresses, which are at least 48 bits, as well as embedding the source and destination protocol addresses in the payload of the packet. The source protocol address indicates to the receiving device the identity of the source device from which the packet was received and thus to which device to respond if a response is required. For the IPX protocol, the ARP process is not required because the MAC address is a constituent of the IP address.

There are three types of layer 2 and layer 3 addresses. A directed or unicast packet includes a specific destination address that corresponds to a single network device. A multicast address corresponds to a plurality of devices on a network, but not all of them. A broadcast address, used in the ARP process for example, corresponds to all of the devices on the network. A broadcast bit is set for broadcast packets, where the destination address is all ones (1's). A multicast bit in the destination address is set for multicast packets.

Figure 2:
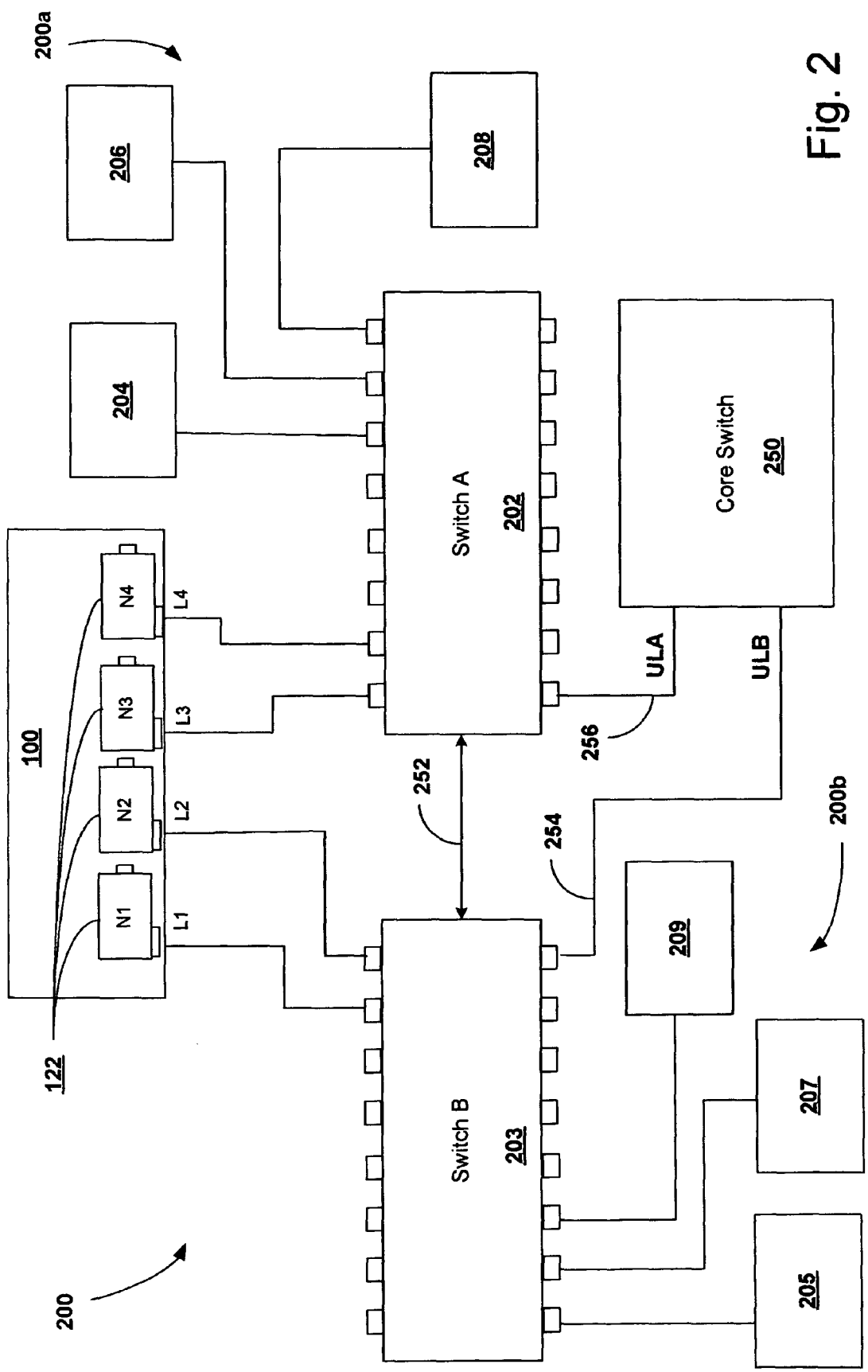
FIG. 2 is a block diagram of a network that illustrates some features used to couple the computer system of FIG. 1 to the network in accordance with an embodiment of the present invention.

Referring now to FIG. 2, a block diagram of a layer 2 network 200 that includes two separate paths 200a and 200b to core switch 250 is shown. Computer system 100 communicates with one or more other devices, such as devices 204, 206, and 208 through network device 202 over path 200a and devices 205, 207, 209 through network device 203 over path 200b. The devices 204 through 209 may be of any type, such as another computer system, a printer or other peripheral device, or any type of network device, such as a hub, a repeater, a router, a brouter, etc. Multiple port network devices 202, 203 can be for example a concentrator, hub, switch or the like.

The computer system 100 is coupled to ports of the network device 202 links L3, L4 and L5. The computer system 100 is further coupled to the network device 203 via links L1, and L2. Links L6-L8 are available, but are shown as currently not allocated. The NICs N1-N4 are shown to provide two NIC ports (and thus two links) each. As previously discussed, these NICs may also be single-port devices or a combination of both single and multi-port NICs as well. It is noted that the computer system 100 may be coupled to the network devices 202, 203 via any number of links from one to some maximum number such as sixteen (16), primarily limited by the number of expansion slots available.

The network 200 of FIG. 2 illustrates the use of teamed interface resources of the computer system 100 to provide two or more redundant links to the contiguous network segment that includes two paths 200a, 200b to a core switch 250 through switches 202, 203 respectively. The example of FIG. 2 further illustrates splitting members of the team (i.e. ports P1-P4) between the two paths of the segment. The team of ports P1-P4 can provide benefits including load balancing and/or fault tolerance, depending upon whether the team is configured to be a TLB or NFT team respectively. The key to teaming two or more NIC ports is to make the team look like a single virtual interface resource or virtual port to the other devices (i.e. devices 202-209) on the same network or subnetwork. This is typically accomplished by assigning one primary MAC address and one protocol (e.g. IP) address to the entire team.

Figure 3:
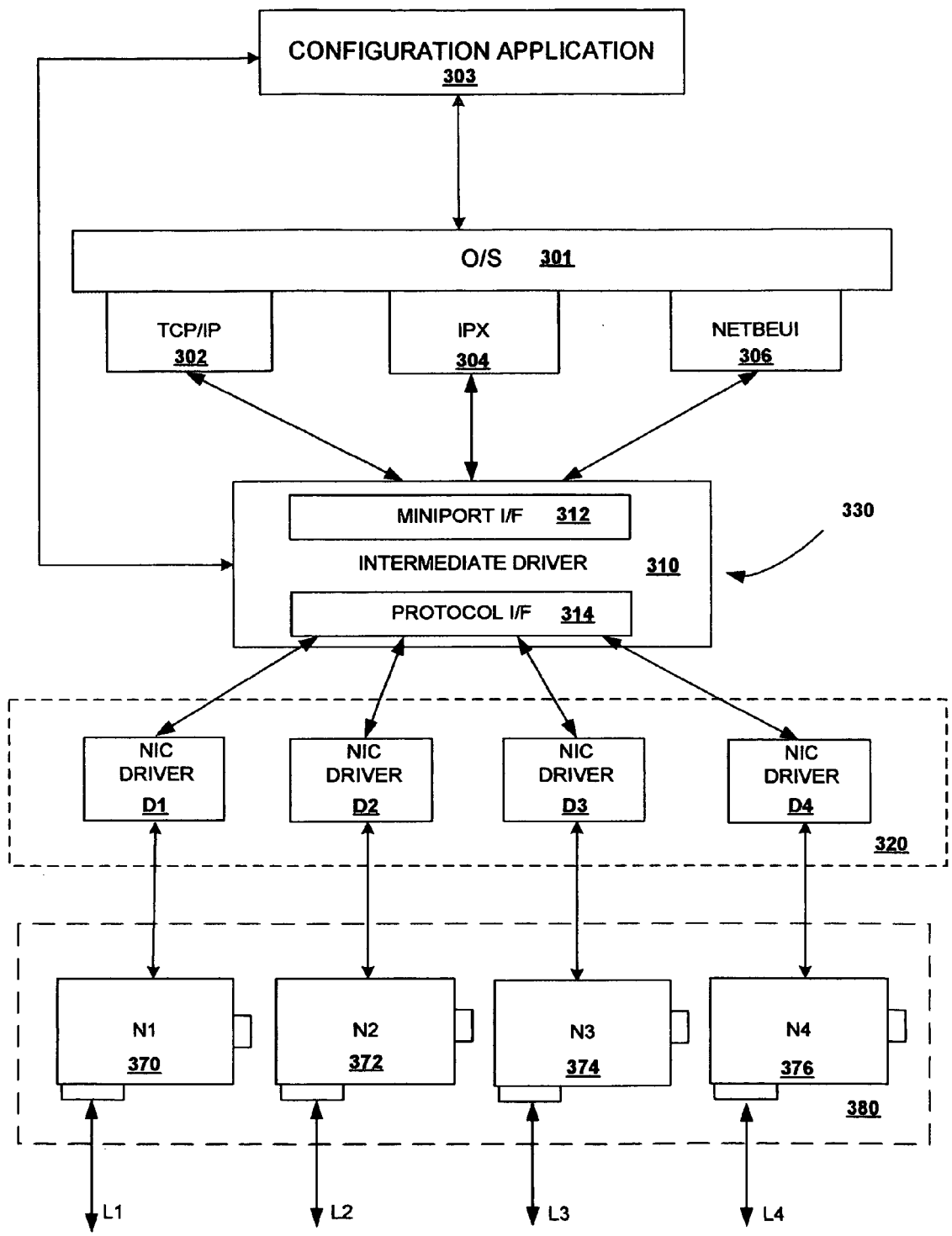
FIG. 3 is a block diagram illustrating some of the components of a controller system installed on the computer system of FIG. 1 and implemented to enable teaming of network resources in accordance with an embodiment of the invention.

A more detailed discussion regarding the teaming mechanism of an embodiment of the invention is now presented with reference to FIG. 3. As previously mentioned, for a team of network adapter ports to operate as a single virtual adapter, all devices on the network must communicate with the team using only one layer 2 address and one layer 3 address. Put another way, a network device must see only one layer 2 (e.g. MAC) address and one protocol address (e.g. IP, IPX) for a team, regardless of the number of adapter ports that make up the team. For the IP protocol address of an Ethernet network, this means that a team will have only one entry in its ARP table (i.e. one MAC address and one IP address) for the entire team.

FIG. 3 is a block diagram illustrating the primary components of an embodiment of a controller system 300 installed on the computer system 100 that enables teaming of any number of NIC ports to create a single virtual or logical device. In the embodiment shown in FIG. 3, computer system 100 is configured with four NICs N1-N4 and instantiations of their drivers D1, D2, D3 and D4 for purposes of illustration. Each instantiation of a driver D1 through D4 is the driver necessary to control the single-port NICs N1-N4. Drivers D1-D4 may be instances of the same driver if N1-N4 are the same NIC, or they may be different drivers if any of their corresponding NICs N1-N4 are different NICs.

The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol exchange) 304, NetBEUI (NETwork BIOS End User Interface) 306, etc. A configuration application 303 program runs in conjunction with O/S 301.

An embodiment of configuration application 303 provides a graphical user interface (GUI) through which users may program configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for displaying teaming configurations and resource status are disclosed in detail in U.S. Pat. No. 6,229,538 entitled "Port-Centric Graphic Representations of Network Controllers," which is incorporated herein in its entirety by this reference. Application 303 provides commands by which the resources can be allocated to teams and reconfigured. A user can interact with the configuration program 303 through the GUIs via one or more input devices, such as the mouse 114 and the keyboard 116 and one or more output devices, such as the display 112.

A hierarchy of layers within the O/S 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302, 304 and 306 interface with the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver makes the group of miniport drivers for each of the NIC ports to be teamed, function seamlessly as one driver that interfaces with the NDIS layer. Thus, the intermediate driver makes the NIC drivers of a team appear to be one NIC driver controlling one NIC port. Prior to the introduction of teaming and the intermediate driver layer 310, a protocol address typically was assigned to each individual network adapter (or NIC) driver at the Miniport Driver Layer 312. In the case of teaming, however, a single protocol address is typically assigned to each instance of the intermediate driver. Thus, the first requirement for teaming has been accomplished with a single protocol address being assigned to each team. For each team of NIC adapter ports, there will be a separate instance of the intermediate driver at the Intermediate Driver Layer 310, each instance being used to tie together those NIC drivers that correspond to the NIC ports belonging to that team.

In this manner, the intermediate driver 310 appears as a single NIC driver to each of the protocols 302-306. Also, the intermediate driver 310 appears as a single protocol to each of the NC drivers D1-D4 and corresponding NICs N1-N4. The NC drivers D1-D4 (and the NICs N1-N4) are bound as a single team 320 as shown in FIG. 3. Because each instance of the intermediate driver can be used to combine two or more NIC drivers into a team, a user may configure multiple teams of any combination of the ports of those NICs currently installed on the computer system 100. By binding together two or more drivers corresponding to two or more ports of physical NICs, data can be transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports providing redundant links L1 through L4 to network 200 of FIG. 2 could be configured as a network fault tolerance (NFT) team. For an NFT team, one of the links (e.g. link L1 provided by a first port of the corresponding NIC N1 370 in FIG. 3) is initially assigned as the primary and is also designated "active." This assignment can be accomplished by default (e.g. the teaming driver 310 simply chooses the team member located in the lowest numbered slot as the primary member). The assignment of the primary could also be accomplished by way of the user manually dictating the choice to the teaming driver 310 through the GUI of the configuration application 303. In the default example of FIG. 3, the second through fourth links of the team (e.g. L2-L4 provided by the ports P2-P4 by NICs N2 and N3) are then designated as "secondary" and placed in a "standby" mode.

Thus, the primary member transmits and receives all packets on behalf of the team. If the active link (i.e. L1) fails or is disabled for any reason, the computer system 100 can detect this failure and switch to one of the secondary links by rendering it the active (and primary) link of the team while placing the failed link L1 in failed mode (and designating it a secondary resource). This process is sometimes referred to as "failover." Communication between computer system 100 and devices 201-209, 250 in FIG. 2 is thereby maintained without any significant interruption. Those of skill in the art will recognize that an embodiment of an NFT team can have any number of redundant links in an NFT team, and that one link of the team will be active and all of the others will be in standby.

Figure 4A:
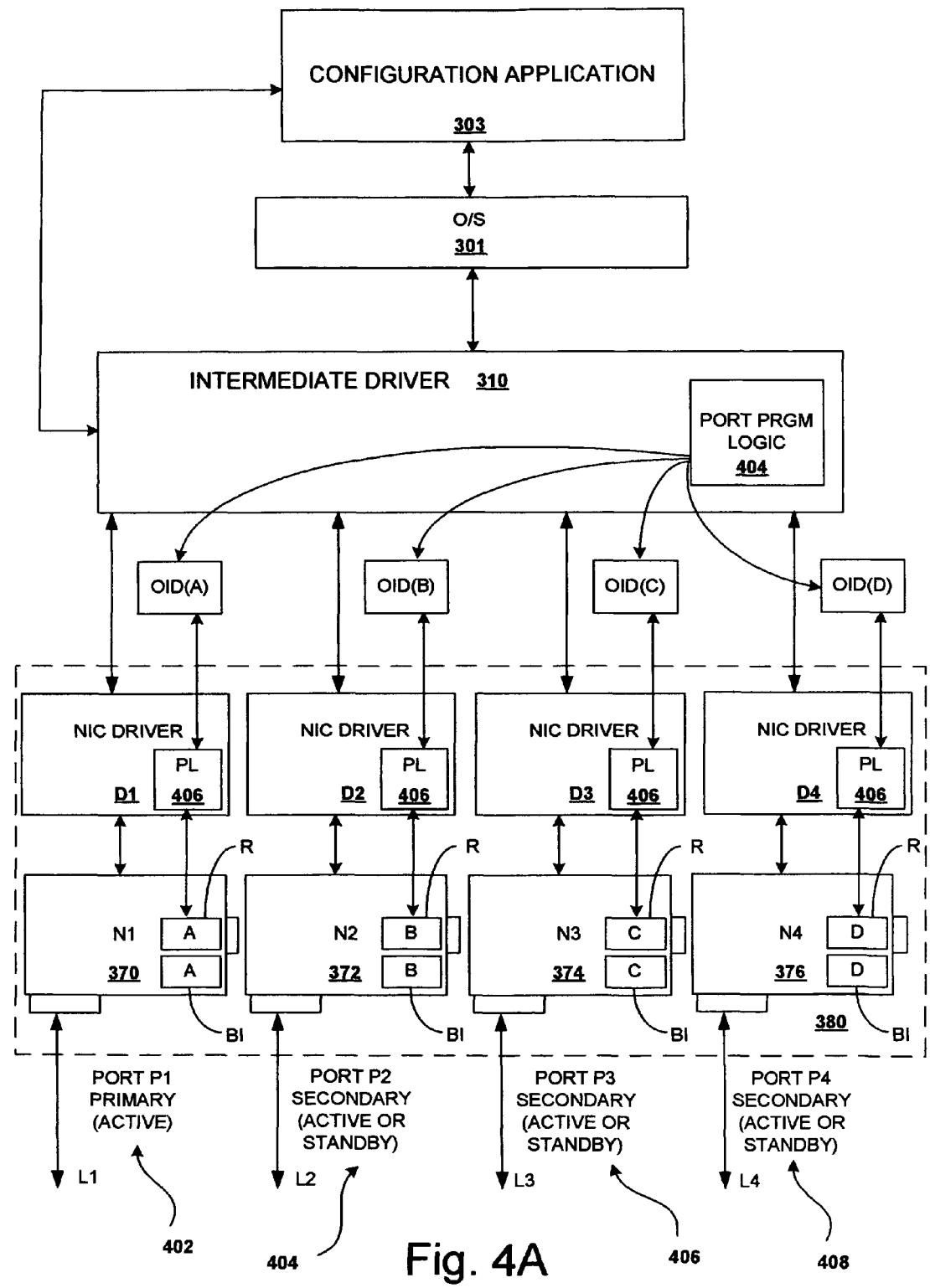
FIG. 4A is a block diagram illustrating network resources of the computer system of FIG. 1 configured as a NFT or TLB team in accordance with an embodiment of the invention.

FIG. 4A is a block diagram illustrating an embodiment of system 100 with four single-port NICs that reflect a configuration that could be either a network fault tolerant (NFT) team as a Transmit load balancing (TLB) team (i.e. there is a single NIC assigned as the primary, and the configuration is a NFT if the other three secondary NICs are placed in a standby mode and is a TLB team if the secondary NICs are placed in an active transmit only mode). An instantiation of the intermediate driver 310 is created for the team upon commands from configuration application 303. Upon initialization, the instance of the teaming driver 310 for the team first reads the BIA (burned-in MAC address) for each member of its team. In FIG. 4A the factory assigned MAC addresses are referred to as A, B, C and D, respectively. The teaming driver then picks one MAC address from the team's pool of BIAs and assigns that to a primary adapter or NIC port. In the example of FIG. 4A, port P1 402 is designated (by default) by the teaming driver 310 to be the primary and active port for the team and is assigned the MAC address for the team. The MAC address assigned to port P1 402 is then written to override register R and all of the remaining ports P2-P4 404, 406, 408 become secondary ports that are programmed with one of the remaining MAC addresses from the pool. For a NFT team the secondary resources are initially placed in standby mode. For a TLB team the secondary resources are placed in active mode. For an NFT team, only the primary receives data from or transmits data to the network on behalf of the computer system 100. For a TLB team, the data received from the network is always received at the primary, while data transmitted from system 100 is balanced over all of the resources. In this case, the MAC address assignments are the same as the BIAs.

The teaming driver 310 includes port program logic 404 that can command the NIC drivers D1-D4 to program the override register R of each of the NICs with the MAC address assignments from the pool. Each of the NIC drivers D1-D4 includes program logic 406 that receives a command, including the override receive address, from the port program logic 404 of the intermediate driver 310. The commands can be issued in the form of an Operation Identifier (OID) to each of the individual NIC drivers D1-D4. Standard NIC drivers are typically designed to recognize a plurality of standard OIDs that are usually sent from the upper level protocols. The override receive address OID used to program the receive address override register is not typically included as a standard OID.

Until the team is reconfigured, the MAC address assigned to the primary adapter is the single MAC address for the team. It should be noted that a user could program the MAC addresses for each of the team members manually. Because there is only one instance of the network teaming ID for each team, and the Layer 3 address is assigned to the ID, there is likewise only one IP address assigned to the team.

Figure 4B:
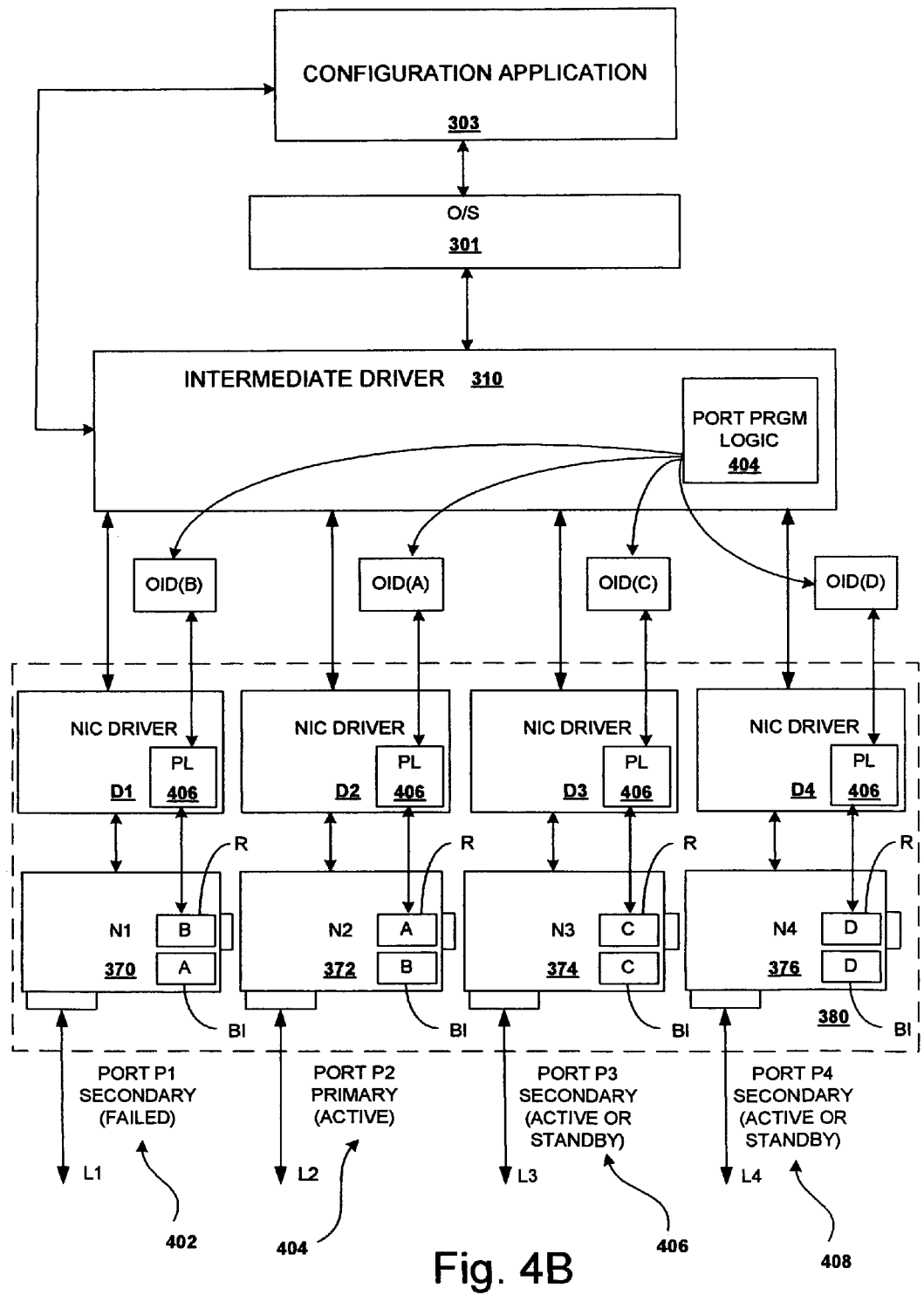
FIG. 4B is a block diagram of the NFT or TLB team of FIG. 4A after a failover condition in accordance with an embodiment of the invention.

For an NFT team, if the currently active port becomes disabled or fails for any reason, a failover occurs whereby a secondary port becomes the active and primary port. FIG. 4B illustrates the team of FIG. 4A after a failover. The MAC addresses between ports P1 402 and P2 404 have been swapped and port P2 404 becomes active and the primary for the NFT team. The NIC 370 providing port P1 402 is placed in a "failed" mode and the failed status of the port P1 402 is communicated by the teaming driver 310 back to the configuration application 303. Likewise, the new "active" status for the NIC 372 providing port P2 404 is also sent to the configuration application 303. If the network device to which the team is coupled is a hub or a repeater, no other change is necessary. If the network device is a switch, the switch learns that the virtual device (i.e. the team) with source address A has moved from link L1 to L2, and begins sending packets with destination MAC address A to the computer system 100 via the link L2.

Thus, when operating in the FT Switch On Fail Mode, the intermediate driver 310 detects failure of the primary port P1 402 and fails over to one of the secondary ports, such as the port P2 404 and the NIC N2 372 as shown in FIG. 4B. The intermediate driver 310 stays with the new primary port P2 404 until it fails, and if so, selects another operable secondary port. If operating in the FT SmartSwitch Mode, after failover from the primary port, such as the port P1 404, the intermediate driver 310 switches back to the previously designated primary port P1 402 if and when the intermediate driver 310 detects the NIC N1 370 is again operable because either it has been repaired or replaced. In any of the fault tolerance (FT)

modes, the significant advantage of the single receive address mode is that a failover does not require the entire network to recognize a change of the receive address to that of the new primary port. Because all of ports P1-P4 in the team are programmed with the same receive address A, the failover can occur as soon as the intermediate driver 310 detects failure of the primary port. After the failover as shown in FIG. 4B, the intermediate driver 310 inserts the address A as the source address of the new primary port P2 404, which is properly handled by the network device 200, 203 of FIG. 2 regardless of whether it is a switch, hub or repeater.

As previously mentioned, load balancing teams can be configured to achieve transmit load balancing or both transmit and receive load balancing. Transmit load balancing (TLB) teams are typically employed when fault tolerance is desired as well as throughput greater than that available through the single primary resource port of an NFT team. This is common for situations such as when the computer system 100 is acting as a database server and its primary role is to transmit data to numerous clients. In this example, its receive throughput requirements are significantly less than that of its transmit throughput requirements and the receive throughput requirements can be handled by the primary adapter alone.

As an example, data throughput can be increased between computer system 100 and network devices coupled to a network (e.g. devices 203-209 coupled to layer 2 sub-network 200, FIG. 2 if the NIC ports providing redundant links L1-L4 are configured as a load balancing team. For TLB teams, one of the ports is designated the primary port, just as in the case of an NFT team, but in this case all secondary members of the team are also active for transmitting data. The port designated as the primary is responsible for receiving all data sent from the devices 203-209 back to the computer system 100. The data to be transmitted is balanced among the primary and secondary ports in accordance with any of a number of load balancing algorithms known to those of skill in the art.

Failover for a TLB team is quite similar to that for an NFT team. If failure occurs on a secondary port, it is simply placed in a failed mode and transmit data is balanced over one fewer port. If the failed port is the primary, the MAC address for the failed primary is swapped with the MAC address assigned to one of the secondary ports, and the secondary port becomes the primary while the failed port becomes a secondary and is placed in a failed mode. The MAC address of the team therefore remains the same. FIGS. 4A and 4B illustrate both NFT and TLB teams. The only difference is whether the secondary ports are in standby mode (NFT teams) or active (TLB teams).

Figure 5:
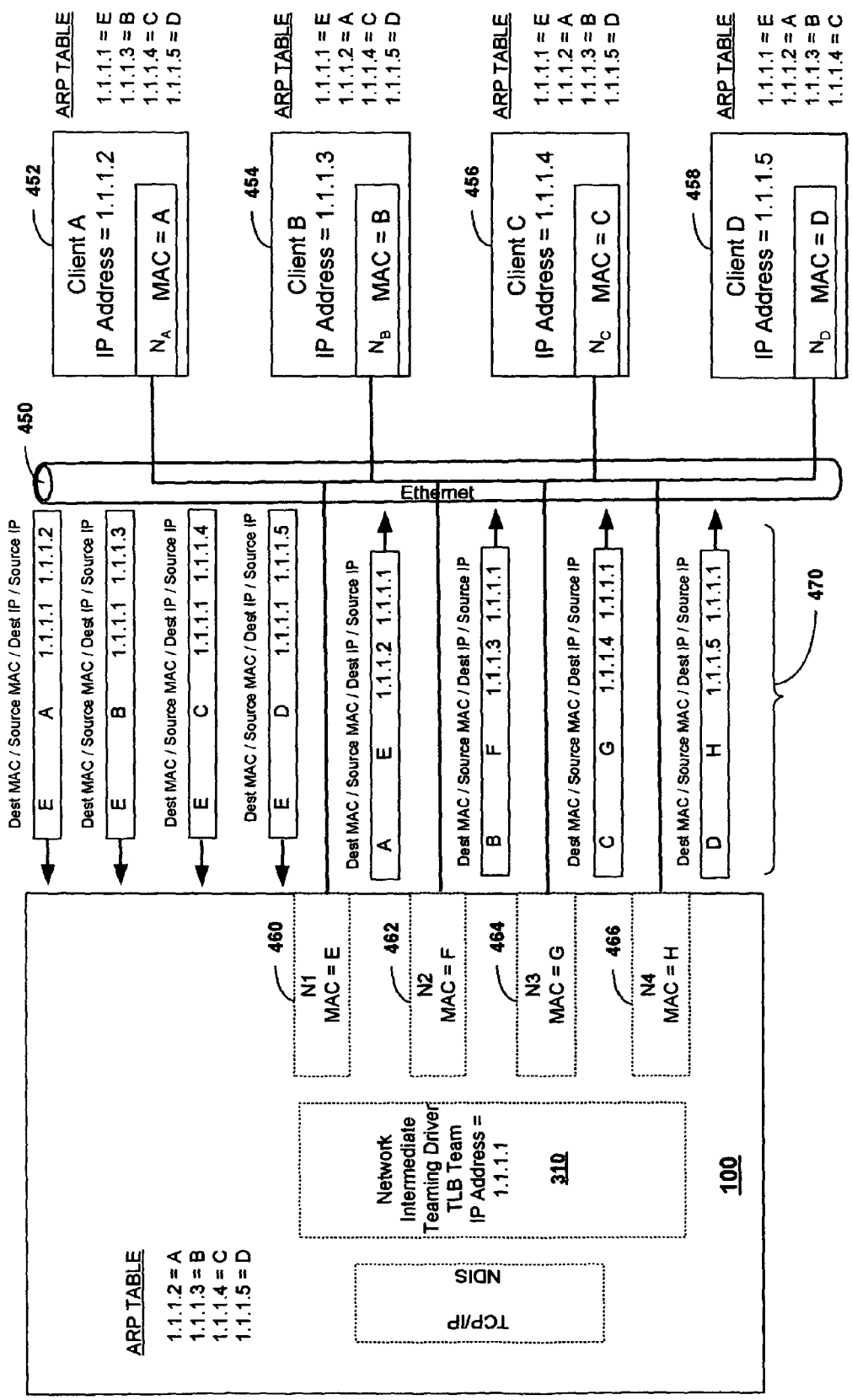
FIG. 5 is a block diagram illustrating network resources of the computer system of FIG. 1 configured as a TLB team in accordance with an embodiment of the invention.

FIG. 5 illustrates a team configured for transmit load balancing. In this example, NIC N1 460 is designated as the primary. NICs N2 462, N3 464 and N4 466 are also active. Each NIC of system 100 is transmitting with its assigned MAC address as indicated by the addressing information for packets 470 being sent to clients 452, 454, 456 and 458 over network 450. In this example, the traffic is balanced such that each NIC N1-N4 of system 100 is handling the traffic between system 100 and one of the clients 452, 454, 456 and 458. All of the traffic sent from the clients back to computer system 100 is received by primary NIC N1 460 at MAC address E.

It should be noted that for a TLB load balancing team, each active member of the team transmits data with its own MAC address. This is not a problem for Ethernet networks employing IP as its network protocol because all source MAC addresses are stripped from packets by the receiving network devices and only the team source IPX address is used to respond back to the team. For networks employing IPX as a protocol, this is not a problem because the source MAC address is only embedded within the IPX protocol address. During an ARP to a team, only the team MAC address is returned to the requesting device and is stored in its ARP cache.

It would be highly desirable to provide a feature by which a TLB or NFT team of network resources can monitor for the cost currently associated with the separate network paths to which it is coupled and adjust the configuration of the team automatically when it detects that a more optimal path to the core network is available. This would enable a team to configure itself initially for optimal throughput to the core network without requiring manual user intervention, as well as to continue to provide an optimal path to the core network as network conditions change, whether as a result of a lost uplink or a reconfiguration of the network.

Figure 6A:
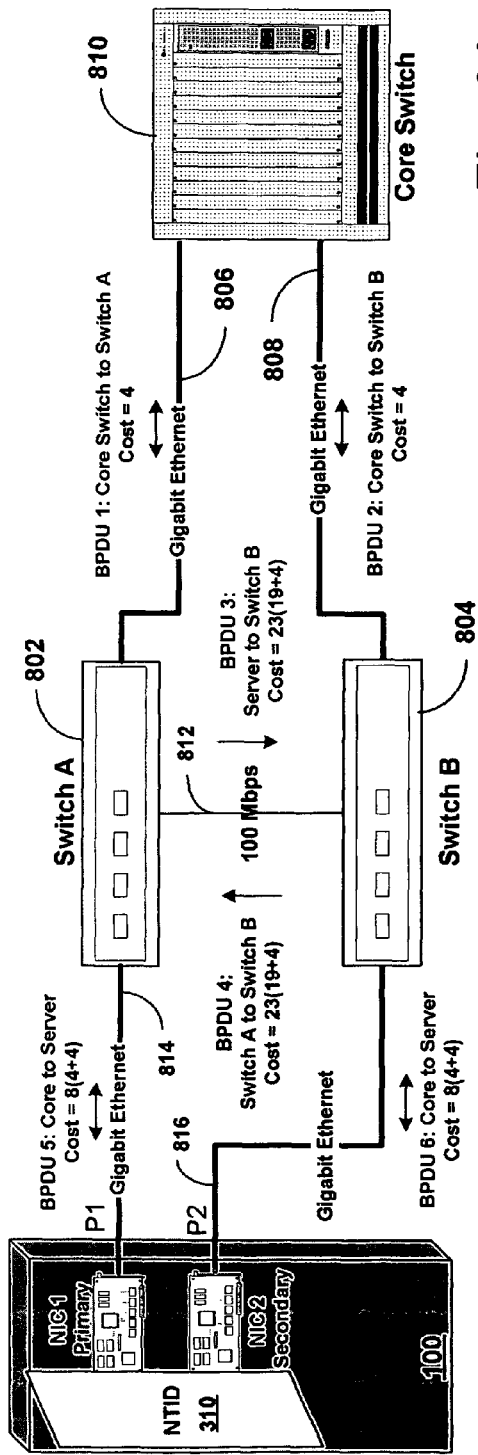
FIG. 6A is a network diagram illustrating the cost for various paths in a network to which a computer system is coupled that features an embodiment of the invention.

FIG. 6A illustrates a topology similar to that of FIG. 2, except that the team of resources has been reduced to the two NICs NIC 1 and NIC 2 (and thus two NIC ports P1 and P2) for simplicity. Otherwise, the two team members NIC1 and NIC 2 are split between two paths to core switch 810 through two switches Switch A 802 and Switch B 804, just as the team of four NICs N1-N4 of FIG. 2. The network devices coupled to the analogous switches 201 and 202 of FIG. 2 are also not shown for purposes of simplicity, but those of skill in the art will recognize that any number of devices may be connected to Switches A 802 and B 804 as may be supported by the technology. Switches A 802 and B 804 are also shown to have a redundant connection 812 between them, as is often the case, to bypass possible failures of their connections to the core switch through uplinks 806 and 808 respectively. For purposes of this discussion, the team comprising NIC 1 and NIC 2 can be either a NFT or a TLB team.

Initially, when configuring the team of FIG. 6A the NIC teaming intermediate driver (NTID) 310 assigns the first NIC (i.e. NIC 1) as the primary NIC for the team. Thus, all packets received by the team from clients coupled to either Switches A 802 and B 804 or coupled to core switch 810, are received by the primary NIC N1 over port P1 814. It follows that all packets received from clients coupled to Switch B 804 must pass through core switch 810 and then through Switch A 802 to port P1 814. As previously described, if the team is an NFT team, all packets transmitted from computer system 100 are transmitted through the primary team member as well. Thus, packets sent to clients on Switch B 804 by system 100 must traverse the same path, but in reverse. If the team is a TLB team, NIC 2 also transmits traffic on behalf of computer system 100 and the transmit traffic load is balanced between NICs 1 and 2 of the team. In this case transmit traffic from system 100 can be traversing both paths to the core switch.

As previously discussed, a default assignment of the primary member will not necessarily choose the team member that is coupled to the highest bandwidth path, even though that would be clearly desirable. Moreover, even if the assignment of primary contemplates the most optimal path initially, network conditions can change, thus rendering the initial choice obsolete.

Information regarding the bandwidth of various connections between network devices on a network is often transmitted between contiguous switches on a network segment or subnet in an effort to manage the traffic flow through very complex networks over the switches and bridges that provide interconnection of various LANs and subnets. This information is typically generated as data defining a cost value for each connection in a path, the cost value being inversely related to the bandwidth of the connection (i.e. the cost value is lowest for those connections with the highest bandwidth and vice versa). As a result, the cost of a path will be the cumulative cost for all of the connections in the path. Those of skill in the art will recognize that for Ethernet networks, a standard for defining this information and a protocol for transmitting it between the switches is known as Spanning Tree and is specified under ANSI/IEEE Std 802.1D, the entirety of which is incorporated herein by this reference.

In an embodiment, upon its instantiation to form a team, the intermediate driver 310 establishes an address necessary to receive the Spanning Tree cost information in accordance with the 802.1D specification. As is known to those of skill in the art, this cost information is transmitted in the form of data called Bridge Protocol Data Units (BPDU). The teaming intermediate driver then extracts from the Spanning Tree frames the data defining the cost values for the paths to which its members are attached. Intermediate driver 310 then makes a relative comparison of the cost values for the paths and assigns the primary to the path having the lowest cumulative cost value, and thus the most optimal path. The intermediate driver 310 continues to monitor the Spanning Tree data and whenever the relative costs of the paths to which the team is coupled change, the intermediate driver 310 simply reassigns the role of primary to the member attached to the path now having the lowest cost value.

In the example of FIG. 6A, both paths to the core switch 810 have equal cost. In this case connections between ports P1 814 and P2 816 to Switches A 802 and B 804 are both Gigabit Ethernet connections. Likewise, the uplinks 806, 808 between Switches A 802 and B 804 and the core switch 810 respectively are also Gigabit Ethernet. These four connections have been assessed an equal cost value of BPDU=4 by the Spanning Tree Protocol, which makes the cumulative cost of both paths the same (i.e. BPDU=8). Therefore in this case, it does not matter which team member is made the primary, and thus the intermediate driver 310 can use the default or the user's choice as provided through the configuration application 303. The link 812 between switches A 802 and B 804 is currently in a standby mode as it is not needed. Spanning Tree has assessed this 100 Mbps link a BPDU=19, reflective of its significantly lower bandwidth.

Figure 6B:
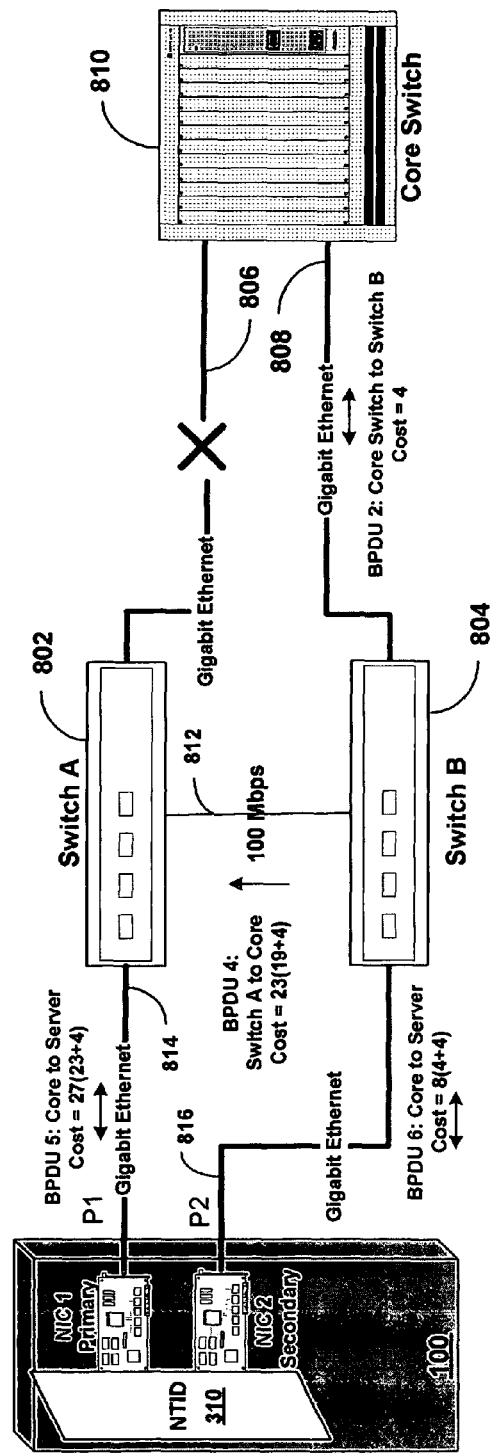
FIG. 6B is the network diagram of FIG. 6A illustrating the effect of a failure on the cost of the various paths in the network.

In FIG. 6B, a failure in the uplink 806 between Switch A 802 and the core switch 810 has occurred. In response, bypass path 812 (BPDU=19) has been pressed into action to maintain connectivity between Switch A 802 and the core switch 810. As a result of this change in the network conditions, the new cumulative cost of the path through which the primary NIC1 and the core 810 are coupled has gone from BPDU=8 to BPDU=27, while the path through which the secondary NIC 2 is coupled to the core 810 through Switch A 802 remains BPDU=8. When the intermediate driver 310 becomes aware of this change in the relative costs of the two paths, it can reassign the role of primary to NIC 2 and make NIC 1 a secondary member of the team, and it still remains active for transmitting only as a secondary member of a TLB team, or becomes idle in standby mode if NIC and NIC 2 form a NFT team. FIG. 7A illustrates the path that is required if NIC1 remains the primary. FIG. 7B illustrates the new path that is used once the intermediate driver has reassigned the primary member to be NIC 2.

Figure 8:
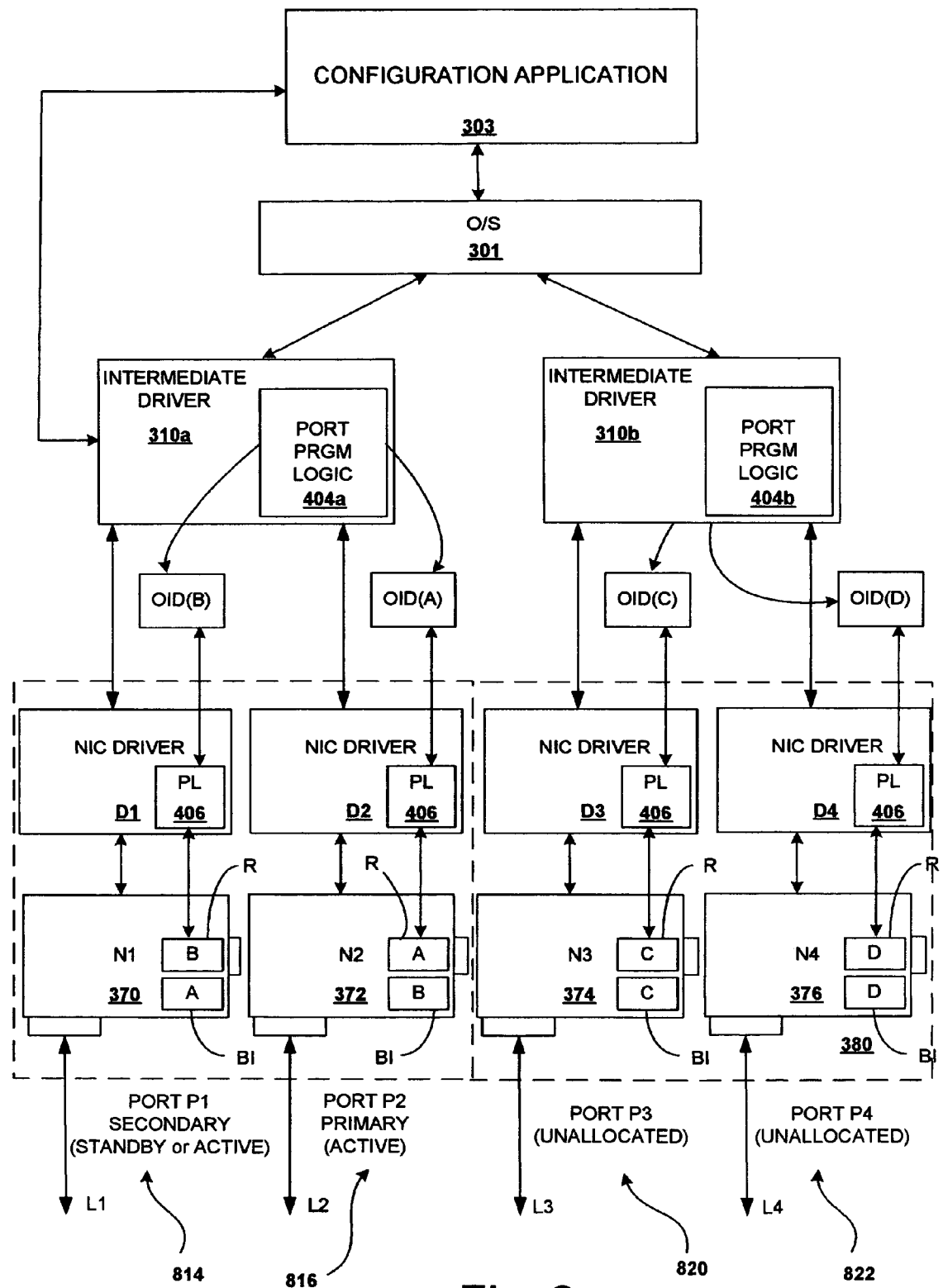
FIG. 8 is a block diagram of the NFT or TLB team of the computer system of FIGS. 6A-7B illustrating the configuration of the team enabling the more optimal path of FIG. 7B in accordance with an embodiment of the invention.

FIG. 8 illustrates an embodiment of the teaming mechanism for the team of NIC 1 and NIC 2 after the primary has been reassigned to NIC 2. NIC1 is now a secondary. If the team is a NFT team, NIC1 is now idled and placed in standby mode. If the team is a TLB team, NIC1 becomes a secondary but remains active to transmit data. Those of skill in the art will recognize that the team can consist of more than two members, and can be split between more than two paths. In FIG. 8, two teams of NICs are illustrated, where the NICs N1 and N2 of FIGS. 6A-7B are formed by a first instantiation 310a of the teaming driver and a second team of NICs N3 and N4 which are bound and controlled by a second instantiation 310b of the teaming driver.

If a team is coupled to more than the two paths of FIGS. 6A-7B (and thus there are more than two team members) the intermediate driver 310 for the team simply monitors the Spanning Tree BPDU data defining cost values for the links comprising all of the paths to which its members are coupled. It then assigns or reassigns the primary role to that team member that is coupled to the path with the lowest current cumulative cost value. If more than one member is coupled to the same path, the instantiation of the teaming driver 310 for that team simply chooses one of the members coupled to the same path to be the primary if that is the most optimal path. Those of skill in the art will further recognize that the invention can be applied to other network types for which data defining cost for the bandwidth of the paths to which its members are coupled is transmitted over the network and is capable of being received by the intermediate driver 310.

What is claimed is:

1. A method of automatically selecting an optimal one of a plurality of paths between a server and a core switch of a layer 2 network through a team of network interface controllers included in the server, the team having one or more members coupled to each one of the plurality of paths, the team controlled by an teaming intermediate driver that provides an interface between the layer 2 network and a layer 3 network, said method comprising, by the teaming intermediate driver:

establishing an address at which the teaming intermediate driver is to receive spanning tree data from network devices in the layer 2 network;

monitoring continuously data on the layer 2 network that defines a cost for each of the plurality of paths, the monitoring comprising receiving the spanning tree data and extracting cost information from the spanning tree data; and configuring the team such that one of the one or more resources coupled to the lowest cost one of the plurality of paths is designated as a primary resource of the team.

2. The method of claim 1 wherein the team of network interface controllers comprises a fault tolerant team and the primary resource is the only member of the team that is transmitting and receiving data on the layer 2 network.

3. The method of claim 1 wherein the team of network interface controllers comprises a transmit load balancing team and the primary resource is the only member of the team that is receiving data on the layer 2 network.

4. The method of claim 1 wherein the data defining the cost of each of the plurality of paths between the core switch and the team is data transmitted between contiguous switches of the layer 2 network.

5. The method of claim 4 wherein the layer 2 network is an Ethernet network and the data transmitted between the switches is generated in accordance with Spanning Tree protocol.

6. The method of claim 1 wherein:

said monitoring further comprises identifying a new lowest cost one of the plurality of paths to the core switch based on the cost data received; and said configuring further comprises reassigning one of the one or more members coupled to the new lowest cost one of the plurality of paths to the core switch to be the primary resource.

7. A server coupled to each one of a plurality of paths to a core switch of a layer 2 network; said server comprising:

a team of network interface controllers, the team having one or more members coupling said server to each one of the plurality of paths; and a teaming driver to bind the drivers of each member of the team and provide an interface from a layer 3 network to the layer 2 network through the members of the team, the teaming driver to:

establish an address at which the teaming intermediate driver is to receive spanning tree data from network devices in the layer 2 network;

monitor continuously data transmitted on the layer 2 network that defines a cost for each of the plurality of paths, wherein to monitor, the teaming driver is to receive the spanning tree data and extract cost information from the spanning tree data; and configure the team such that one of the one or more resources coupled to a lowest cost one of the plurality of paths is designated as a primary resource of the team.

8. The server of claim 7 wherein the team of network interface controllers comprises a fault tolerant team and the primary resource is the only member of the team that is transmitting or receiving data on the network.

9. The server of claim 7 wherein the team of network interface controllers comprises a transmit load balancing team and the primary resource is the only member of the team that is receiving data on the network.

10. The server of claim 7 wherein the data defining the cost of each of the plurality of paths to the core switch is data transmitted between contiguous switches of the layer 2 network.

11. The server of claim 10 wherein the layer 2 network is an Ethernet network and the data transmitted between the switches is generated in accordance with Spanning Tree protocol.

12. The server of claim 7 wherein:

the teaming intermediate driver identifies a new lowest cost one of the plurality of paths to the core switch based on the cost data received; and the teaming intermediate driver automatically reassigns one of the one or more members coupled to the new lowest cost one of the plurality of paths to the core switch to be the primary resource.

13. A method of automatically selecting an optimal one of a plurality of paths between a server and a core switch of a layer 2 network through a team of network resources included in the server, the team having one or more members coupled to each one of the plurality of paths, the team controlled by a teaming intermediate driver that provides an interface between the layer 2 network and a layer 3 network, said method comprising:

the teaming intermediate driver monitoring continuously spanning tree data on the layer 2 network that defines a cost for each of the plurality of paths, the cost defining data being transmitted between switches of the layer 2 network; and the teaming intermediate driver configuring the team such that one of the one or more resources coupled to the lowest cost one of the plurality of paths is designated as a primary resource of the team.

14. The method of claim 13 wherein the layer 2 network is an Ethernet network and the data transmitted between the switches is generated in accordance with Spanning Tree protocol.

15. The method of claim 13 wherein said monitoring further comprises establishing an address through which the teaming intermediate driver is to receive the defining cost transmitted by the switches.

16. The method of claim 13 wherein:

said monitoring further comprises identifying a new lowest cost one of the plurality of paths to the core switch based on the cost data received; and said configuring further comprises reassigning one of the one or more members coupled to the new lowest cost one of the plurality of paths to the core switch to be the primary resource.

* * * * *